(12) United States Patent
Fan

(10) Patent No.: US 10,118,526 B1
(45) Date of Patent: Nov. 6, 2018

(54) HEAD-AND-NECK SUPPORT DEVICE

(71) Applicant: Eagle Fan, Hsinchu County (TW)

(72) Inventor: Eagle Fan, Hsinchu County (TW)

(*) Notice: Subject to any disclaimer, the term of this patent is extended or adjusted under 35 U.S.C. 154(b) by 0 days.

(21) Appl. No.: 15/719,629

(22) Filed: Sep. 29, 2017

(51) Int. Cl.
*B60N 2/874* (2018.01)
*B60N 2/882* (2018.01)
*B60R 11/02* (2006.01)
*B60R 11/00* (2006.01)
*A47C 7/38* (2006.01)
*B60N 2/28* (2006.01)

(52) U.S. Cl.
CPC .......... *B60N 2/882* (2018.02); *B60N 2/874* (2018.02); *A47C 7/383* (2013.01); *B60N 2/2851* (2013.01); *B60R 11/0241* (2013.01); *B60R 11/0252* (2013.01); *B60R 2011/0017* (2013.01)

(58) Field of Classification Search
CPC ....... A47C 7/383; B60N 2/2851; B60N 2/874
USPC ....... 297/220–222, 275, 398, 400, 403, 408; 248/118, 312; 224/558, 275
See application file for complete search history.

(56) References Cited

U.S. PATENT DOCUMENTS

| | | | | |
|---|---|---|---|---|
| 4,639,036 A * | 1/1987 | Nichols | ............ | A47C 7/62 248/230.2 |
| 4,971,393 A * | 11/1990 | Maisenhalder | ........ | A47C 7/383 297/397 |
| 5,207,481 A * | 5/1993 | Ayala, Jr. | ............ | A47D 15/006 297/423.4 |
| 5,904,406 A * | 5/1999 | Stewart | ................. | A47C 7/383 297/220 |
| 7,325,877 B2 * | 2/2008 | Brockman | ............ | B60N 2/844 297/408 |
| 7,410,218 B2 * | 8/2008 | Kotani | .................... | B60N 2/885 297/408 |
| 8,708,415 B2 * | 4/2014 | Gabriel | ................. | B60N 2/286 297/397 |
| 8,708,416 B2 * | 4/2014 | Stronconi | ............. | A47C 20/02 297/397 |
| 8,851,573 B2 * | 10/2014 | Klokk | ....................... | A47C 7/38 297/391 |
| 8,888,187 B2 * | 11/2014 | Albino | ................. | B60N 2/4879 297/397 |
| 9,174,587 B2 * | 11/2015 | Fan | ......................... | B60R 11/02 |
| 9,399,422 B2 * | 7/2016 | Hungerford | ........... | B60N 2/874 |
| 2010/0078972 A1* | 4/2010 | Sayanna | .............. | B60N 2/3011 297/61 |

(Continued)

*Primary Examiner* — Syed A Islam
(74) *Attorney, Agent, or Firm* — Lin & Associates Intellectual Property, Inc.

(57) ABSTRACT

A HANS (head-and-neck support) device includes: a fixing frame for installing on a head support of a vehicle seat; a rotary arm connected pivotally to the fixing frame and having a curved extension portion such that the rotary arm is rotatable limitedly to a predetermine angle with respect to the fixing frame, where the rotary arm extends perpendicularly from the fixing frame: and a soft pillow including a flexible cushion sheath sleeved over a curved extension portion of the rotary arm and an externally enclosing sheath sleeved around the cushion sheath; wherein, when the rotary arm is rotated to a position to abut against the fixing frame, the soft pillow is used for supporting the neck of a user and when the rotary arm is rotated to the predetermined angle, the soft pillow is used for supporting a lateral side of the user's head.

6 Claims, 7 Drawing Sheets

(56) References Cited

U.S. PATENT DOCUMENTS

| | | | | |
|---|---|---|---|---|
| 2011/0148170 A1* | 6/2011 | Grable | ................... | B60N 2/859 |
| | | | | 297/408 |
| 2011/0254339 A1* | 10/2011 | Bruck | .................... | B60N 2/844 |
| | | | | 297/403 |
| 2012/0007405 A1* | 1/2012 | Kim | ....................... | B60N 2/885 |
| | | | | 297/397 |
| 2012/0326481 A1* | 12/2012 | Yetukuri | ................ | B60N 2/856 |
| | | | | 297/403 |
| 2013/0068809 A1* | 3/2013 | Wang | ..................... | B60R 11/02 |
| | | | | 224/275 |
| 2013/0200119 A1* | 8/2013 | Ackeret | ............. | B60R 11/0235 |
| | | | | 224/275 |
| 2014/0117735 A1* | 5/2014 | Rao | ........................ | B60N 2/002 |
| | | | | 297/403 |
| 2015/0197169 A1* | 7/2015 | Hungerford | ........... | B60N 2/882 |
| | | | | 297/392 |

* cited by examiner

HEAD-AND-NECK SUPPORT DEVICE

BACKGROUND OF THE INVENTION

1. Field of the Invention

The present invention relates generally to a HANS (head-and-neck support) device, and more particularly to one which is adapted to be installed on a head support pillar of a vehicle seat so as to support the head and/or neck of a user or the HANS device can be mounted behind the vehicle seat such that a portable electronic device can be mounted on the HANS device so that a passenger seated behind the vehicle seat can use the portable electronic device.

2. The Prior Arts

Portable electronic device (such as a smart phone, flat type computer etc.) is an indispensable communication and/or entertaining device for majority of common man. However, if a driver carries a portable electronic device with him during the driving operation is a risky job, but for the traveling passengers, the portable electronic devices become entertaining apparatuses for them to get rid off the boring time while traveling to their destination. To facilitate the passengers to use their portable electronic devices, some hanging and/or carrier-type support devices are generally mounted on the head support pillar of a vehicle seat so as to assist in hanging of the portable electric devices thereon such that the passenger seated behind the vehicle seat of the front row can watch and/or use the portable electronic device.

Generally speaking, a front seat in a vehicle includes a seat portion, a backrest portion and a head support mounted on the backrest portion such that after the driver and/or the passenger are seated on the seat portion, their backs can lean against or rest on the backrest portion while their heads slightly rest on or float from the head support. If the head is not properly supported by the head support during a long journey, one may easily feel tire and/or discomfort and in reverse if the head is properly supported and moreover, if the driver and/or the passenger can rest at least for a while on the long journey, he may feel fresh and hence concentrates his attention to the driving operation and it is helpful for traffic safety. It is noted that no auxiliary structures are provided on the head support of a conventional vehicle seat such that the passenger seated on these vehicle seats have their heads swung sidewise once they fall asleep during the trips. In other words, the passengers cannot enjoy a comfort resting during the trip. Even though, some vehicle seats available in the market are designed in such a manner to support the head of a seated person, but the design fails to fulfill two functions, namely: (1) to support the head and/or neck of a user and (2) a portable electronic device cannot be mounted on the head support so that a passenger seated behind the front row vehicle seat cannot use the portable electronic device. These drawbacks inspire the inventor for development of the present HANS device to comply with the current situation.

SUMMARY OF THE INVENTION

A primary objective of the present invention is to provide a HANS (head-and-neck support) device, which is adapted to be installed on a head support pillar of a vehicle seat so as to support the head and/or neck of a user and when a clamp device is further implemented, the HANS device can be mounted the vehicle seat such that a portable electronic device can be mounted thereon so that a passenger seated behind the vehicle seat can use the portable electronic device.

For achieving the foregoing objectives, the present invention provides a HANS (head-and-neck support) device, including: a fixing frame adapted to be installed on a head support pillar of a vehicle seat; a rotary arm connected pivotally to one end of the fixing frame and having a curved extension portion such that the rotary arm is rotatable limitedly to a predetermine angle with respect to the fixing frame, where the rotary arm extends perpendicularly from the fixing frame: and a soft pillow including a flexible cushion sheath sleeved over the curved extension portion of the rotary arm and an externally enclosing sheath sleeved around the cushion sheath.

The HANS device of the present invention is adapted to be mounted a head support pillar of a vehicle seat, wherein, when the rotary arm is rotated relative to and abuts against the fixing frame, the soft pillow is located between the vehicle seat and the head support pillar so that the soft pillow is used for supporting the neck of a driver and/or a passenger so as to provide comfort and when the rotary arm is rotated to the predetermined angle relative to the fixing frame, the soft pillow is used for supporting a lateral side of the user's head.

Preferably, the fixing frame includes a rack defining the end for pivotally connection with the rotary arm and two clamp units mounted on the rack in such a manner that the clamp units are movable along a longitudinal length of the rack.

Preferably, the rack has an upper and lower side surfaces, each of which is formed with a plurality of insert holes along its longitudinal length thereof and a generally U-shaped insert that is adapted to be disposed on and span across a respective one of the clamp units for inserting into two of the insert holes, thereby retaining securely the respective one of the clamp units on the rack.

Preferably, each of the clamp units includes a main clamp piece, a movable clamp piece mounted on the main clamp piece and movable along the longitudinal length of the rack and a rotary knob mounted on the movable clamp piece in such a manner that rotation of the rotary knob results in movement of the movable clamp piece toward and away from the main clamp piece and simultaneously resulting in tightening and/or loosening of the main clamp piece relative to the rack.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
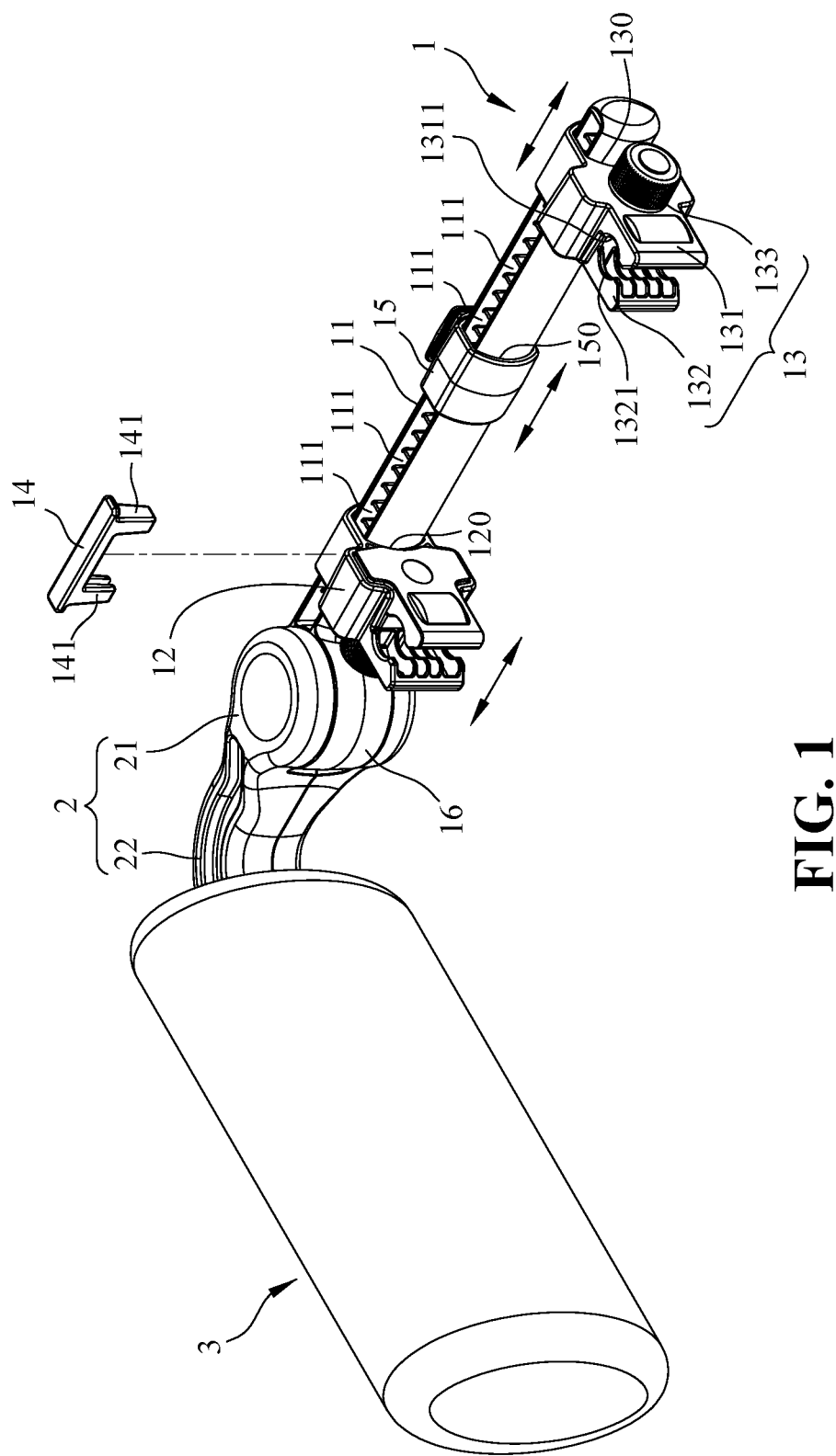
FIG. 1 is a perspective view of a HANS device of the present invention.
Figure 2:
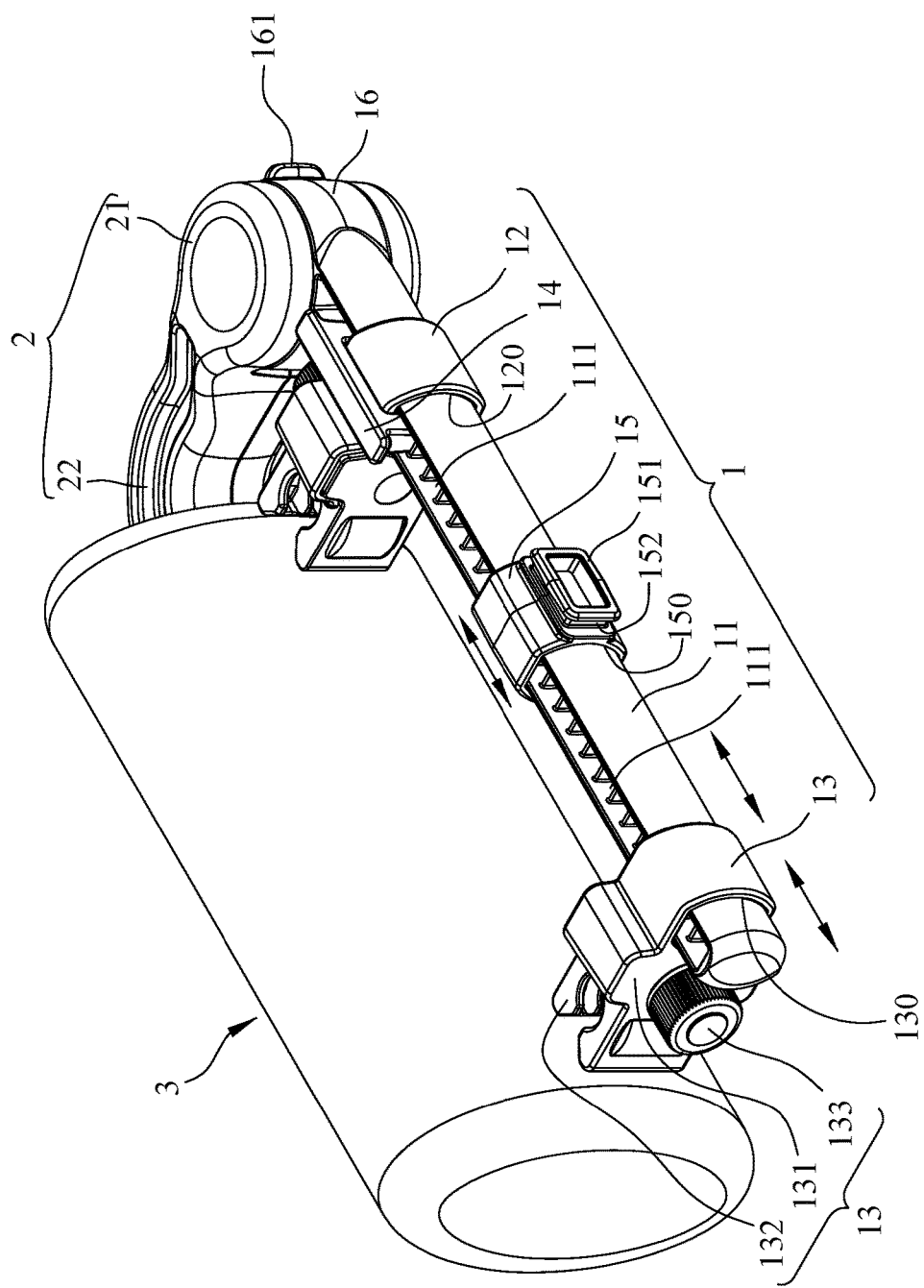
FIG. 2 is a perspective view of the HANS device of the present invention in a folded state.

Referring to FIGS. 1 and 2, wherein, FIG. 1 is a perspective view of a HANS (head-and-neck support) device of the present invention and FIG. 2 is a perspective view of the HANS device of the present invention in a folded state. A HANS (head-and-neck support) device of the present invention includes: a fixing frame 1, a rotary arm 2 and a soft pillow 3. The fixing frame 1 is adapted to be installed on a head support pillar of a vehicle seat (not shown) and the rotary arm 2 is connected pivotally to the fixing frame 1 and has a curved extension portion 22 such that the rotary arm 2 is rotatable limitedly relative to and abuts against the fixing frame 1, where the soft pillow 3 is used for supporting the neck of a user and to a predetermine angle with respect to the fixing frame 1, where the rotary arm 2 extends perpendicularly from the fixing frame 1, where at this time, the soft pillow 3 is used for supporting a lateral side of the head of a person seated on the vehicle seat.

Figure 3:
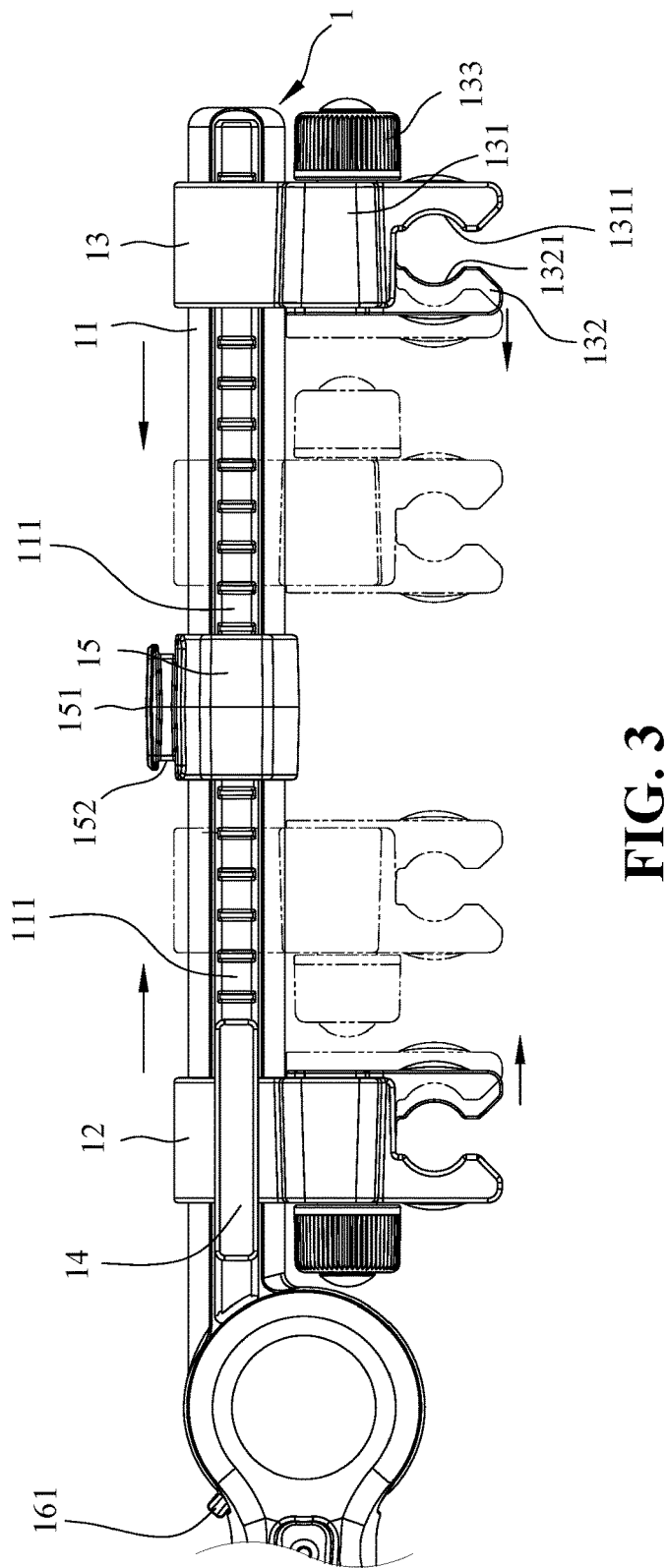
FIG. 3 is an enlarged view of a fixing frame employed in the HANS device of the present invention.
Figure 4:
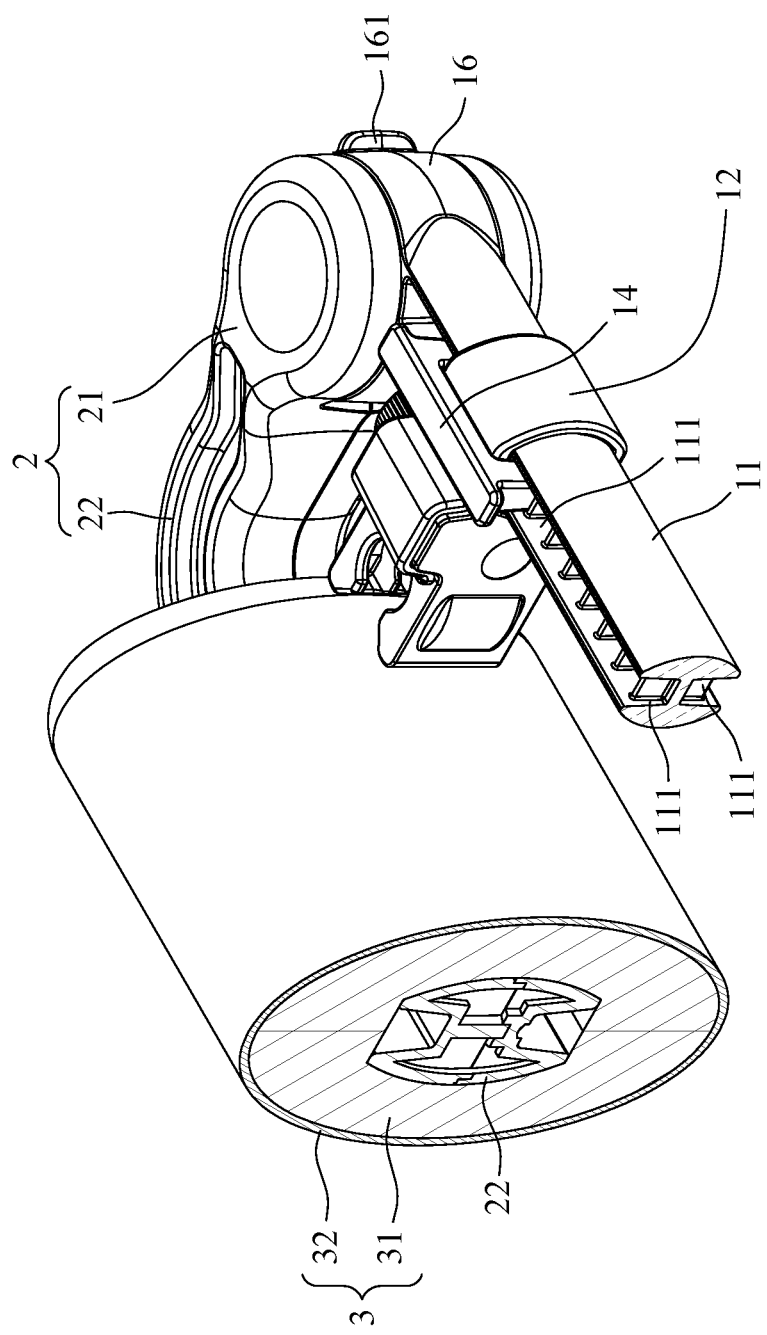
FIG. 4 is a fragmentary enlarged view of the HANS device of the present invention.

The fixing frame 1 includes a rack 11 defining the end for pivotally connection with the rotary arm 2 and two clamp units 12, 13 mounted on the rack 11 in such a manner that the clamp units 12, 13 are movable along a longitudinal length of the rack 11, as best shown in FIG. 3. The cross section of the rack 11 is not limited to a circular shape, but should be an elongated shape to extend through the holes 120, 130 of the clamp units 12, 13. Referring to FIG. 4, in order to fix stably one of the clamp units 12, 13 on the rack 11, the rack 11 has upper and lower surfaces indented inward respectively in such a manner to have a H-shaped cross section and a plurality of insert holes 111 along its longitudinal length thereof such that a generally U-shaped insert 14 can be disposed on and span across a respective one of the clamp units 12, 13 for inserting two insert stems 141 of the U-shaped insert 14 into two of the insert holes 111, thereby retaining securely the respective one of the clamp units 12, 13 on the rack 11. In this embodiment, each insert stem 141 of the U-shaped insert 14 can be fittingly inserted into a respective one of the insert holes 11 and two insert stems 141 define a distance equivalent to three insert holes 111 combined. To be more specific, since two insert stems 141 of the U-shaped insert 14 span across the clamp unit 12 and are inserted into two insert holes 111 of the rack 11, the clamp unit 12 is retained stably on the rack 11 while the clamp 13 is movable along the longitudinal length of the rack 11. However, the scope of the present invention should not be limited only thereto, the clamp unit 13 can be fixed on the rack 11 also by another insert and in this case there should be two U-shaped inserts 14.

In this embodiment, both the clamp units 12, 13 have the same structure. Referring to FIGS. 1 and 3, each of the clamp units 12, 13 includes a main clamp piece 131 having the hole 130 sleeved on the rack 11 and slidable along the longitudinal length thereof, a movable clamp piece 132 mounted on the main clamp piece 131 and a rotary knob 133 mounted on the movable clamp piece 132 in such a manner that rotation of the rotary knob 133 via inner threads results in movement of the movable clamp piece 132 toward and away from the main clamp piece 131 and simultaneously resulting in tightening and/or loosening of the main clamp piece 131 relative to the rack 11. The main clamp piece 131 has a curved clamping face 1311 while the movable clamp piece 132 has a mating curved clamping face 1321, a combination of the two clamping faces 1311, 1321 can securely clamp the head support pillar of the vehicle seat, thereby mounting the fixing frame 1 on the head support pillar of the vehicle seat.

In order to permit mounting of a carry-along portable electronic device, such as an ipad, on the HANS device of the present invention, the fixing frame 1 further includes a hook member 15 mounted on the rack 11 so as to be disposed between the two clamp units 12. 13 and is movable along the longitudinal length of the rack 11. The hook member 15 preferably has a sleeve hole 150 for sleeving slidably on the rack 11 and a protruded hook 151 (see FIG. 2) with a configuration complementing with an article to be hung on the protruded hook 151. In this embodiment, the protruded hook 151 has a narrow neck portion 152 with a shape complementing with an article (such as smart phone) to permitting hanging of the smart phone on the protruded hook 151.

The a rotary arm 2 is connected pivotally to one end of the fixing frame 1 via a pivot member 16 which extends and is fixed through the pivot seat 21 of the rotary arm 2 such that the rotary arm 2 is rotatable limitedly to the predetermine angle with respect to the fixing frame 1, where the rotary arm 2 extends perpendicularly from the fixing frame 1. The pivot member 16 has a stop block 161 formed externally thereof to limit the largest rotation angle of the rotary arm 2 relative to the fixing frame 1. The curved extension portion 22 of the rotary arm 2 is located at an opposite side of the pivot seat 21.

Referring to FIG. 4, the soft pillow 3 includes a flexible cushion sheath 31 fabricated from elastic and breathing cloths, such as sponge, gel and cotton, sleeved over the curved extension portion 22 of the rotary arm 2 and an externally enclosing sheath 32 fabricated from woven clothing and/or breathable fabric and sleeved around the cushion sheath 31 so as to prevent untimely disengagement of the soft pillow 3 from the curved extension portion 22 of the rotary arm 2.

Figure 5:
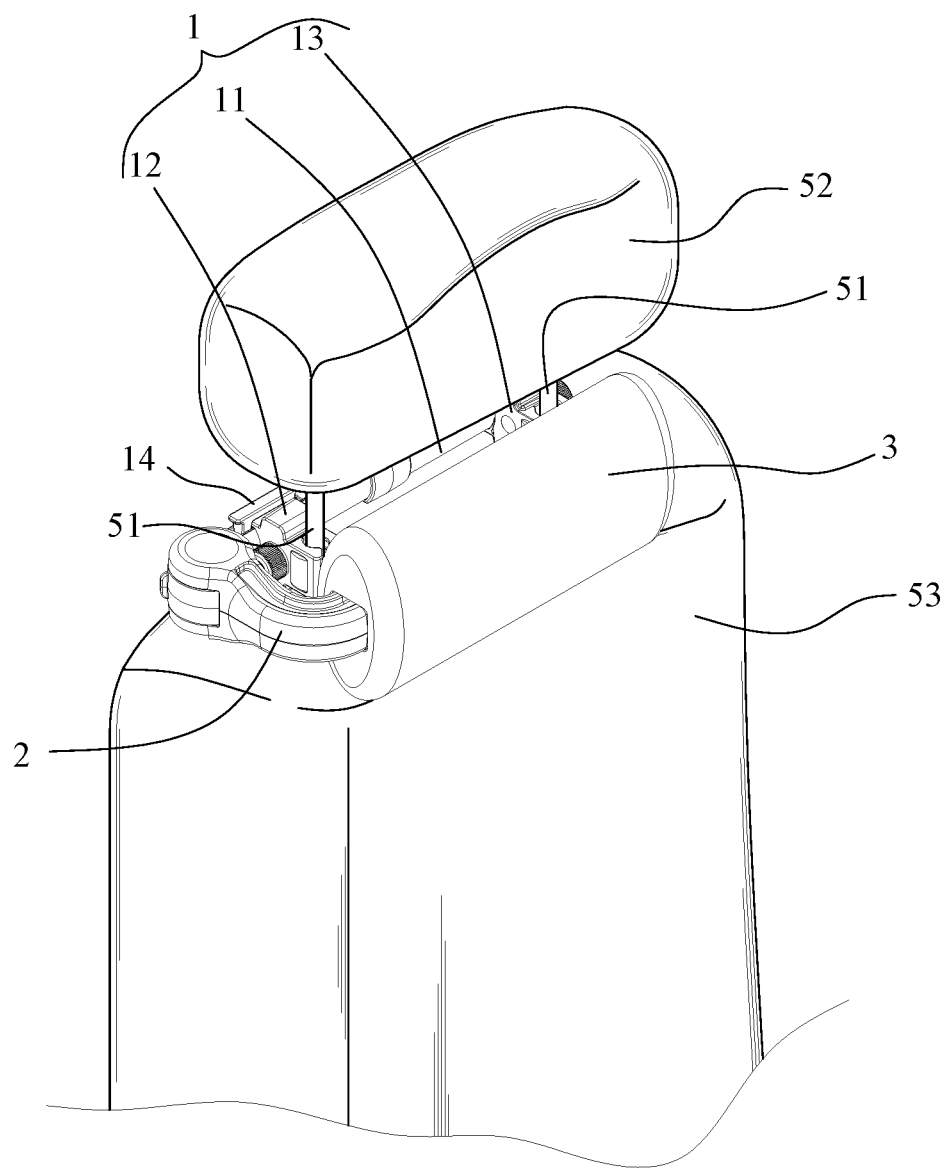
FIG. 5 shows the HANS device of the present invention mounted on a head support pillar of a vehicle seat.

Application of the HANS device of the present invention will be described in the following. FIG. 5 shows the HANS device of the present invention mounted on a head support pillar of a vehicle seat. As shown, the pillars 51 are used for supporting a head support 52 thereon, which in turn, is mounted on the top part of a backrest portion of the vehicle seat 53 in such a manner that the fixing frame 1 is located at a rear part of the vehicle seat 53. At this time, the two clamp units 12, 13 on the rack 11 respectively and securely clamp the pillars 51 by virtue of slidable movement along the longitudinal length of the rack 11 and due to insertion of two U-shaped inserts 14 over and into the insert holes 111 in the rack 11, where the rotary arm 2 can be rotated to a position, where the soft pillow 3 is located between the head support 52 and the top part of the seat portion and where the soft pillow 3 slightly abuts against the fixing frame 1. Under this condition, the soft pillow 3 is adapted to support the neck of the person seated on the vehicle seat 53, thereby providing ease comfort to the seated person.

Figure 6:
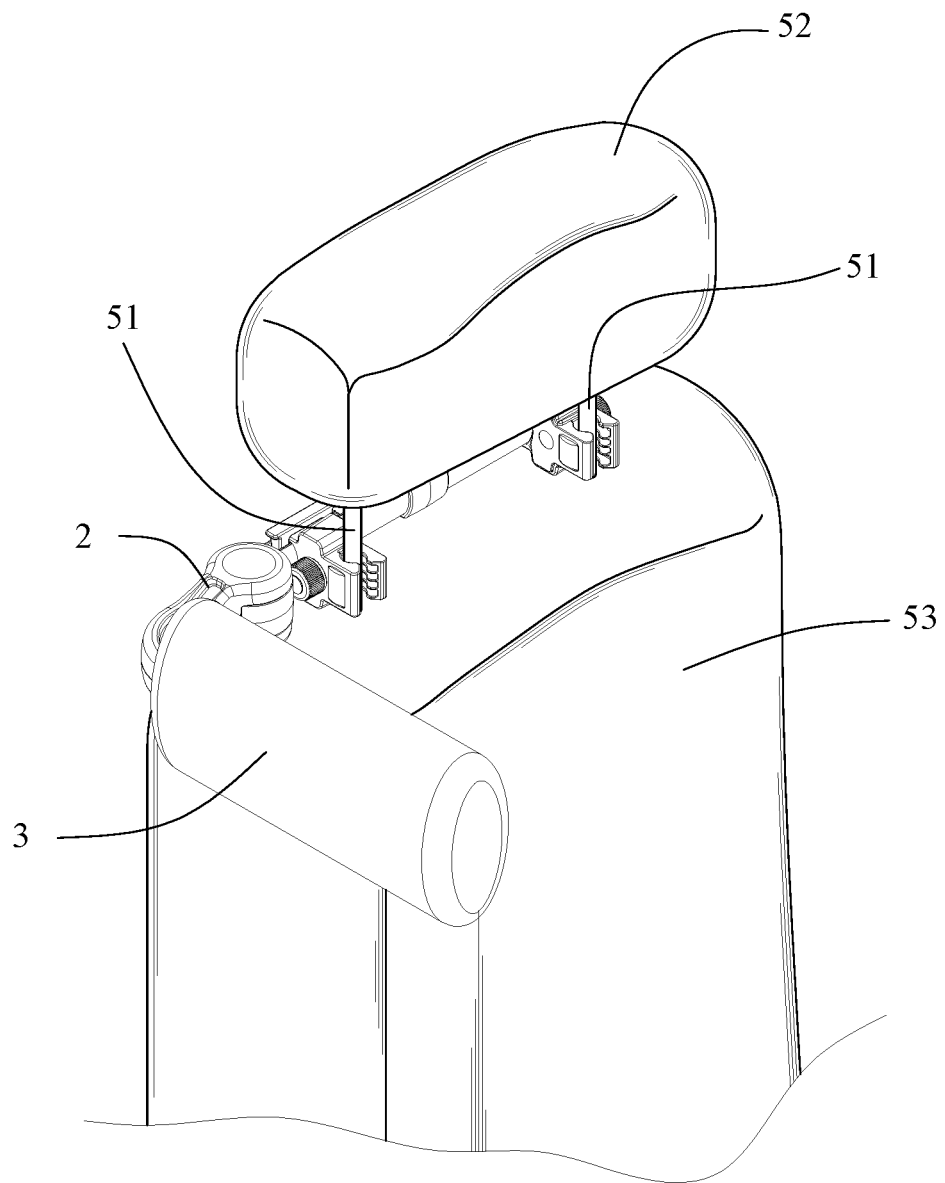
FIG. 6 shows a perspective view of the HANS device of the present invention after mounted on the head support pillar of a vehicle seat for supporting a lateral side of the head of a seated person.

FIG. 6 shows a perspective view of the HANS device of the present invention after mounted on the head support pillar of a vehicle seat and when the rotary arm 2 is rotated to the predetermined angle with respect to the fixing frame 1 for supporting a lateral side of the head of a seated person. Under this condition, the passenger and/or the seated person can have a nap by leaning his lateral side of the head against the soft pillow 3. In this embodiment, the rotary arm 2 is mounted pivotally to one end of the fixing frame 1 so that after it is rotated to the predetermined angle, the soft pillow 3 is located at the left side in FIG. 6. When it is required to place the soft pillow 3 at the right side in FIG. 6, dismantling the fixing frame 1 and after turning it 180 degrees for fixing back on the pillars 51 should be conducted. The two mounting methods provide the similar functions.

Figure 7:
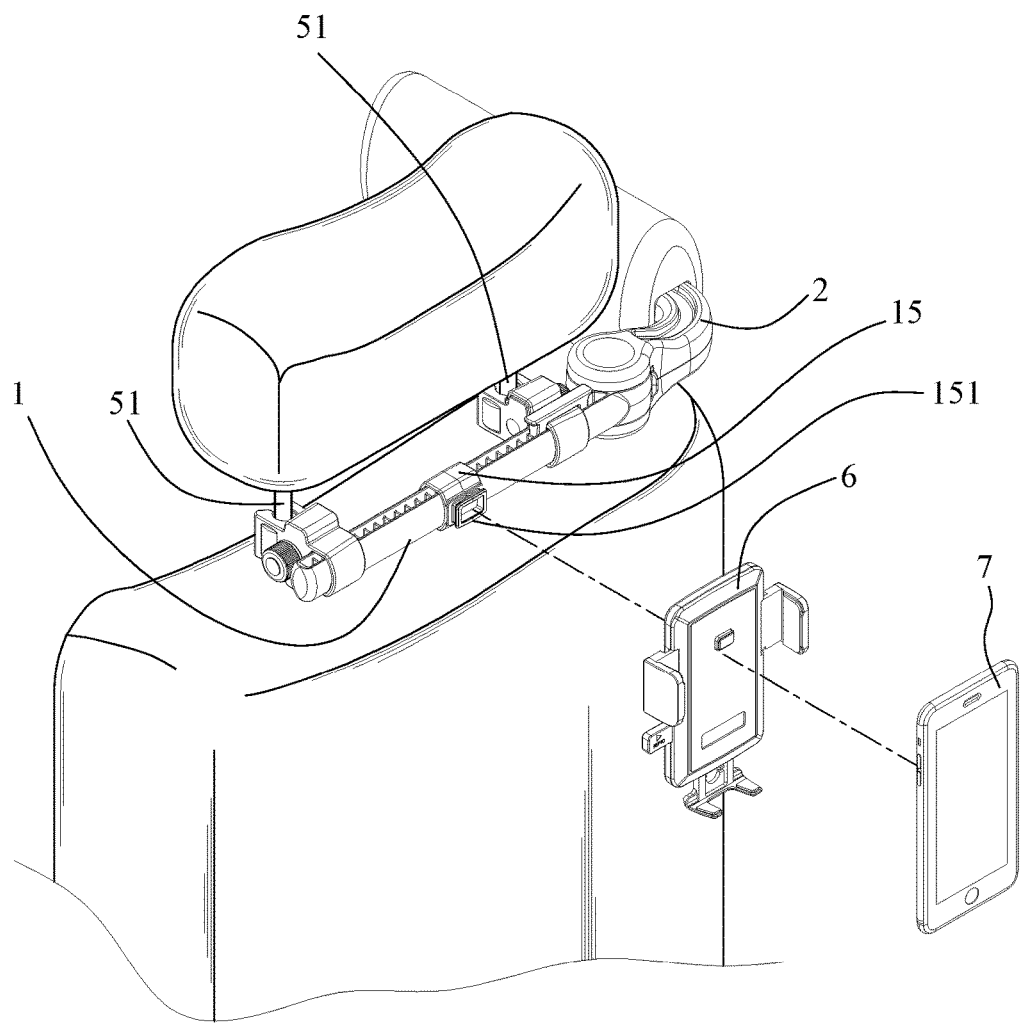
FIG. 7 shows the HANS device of the present invention after mounted on the head support pillar of the vehicle seat, illustrating a state how a portable electronic device can be mounted thereon.

Referring to FIG. 7, in case a portable electronic device, such as an ipad or smart phone, carries along with the passenger is intended to be hung on the HANS device of the present invention, a retention flap (not visible) of a clamping assembly 6 should first of all be hooked into the narrow neck portion 152 of the protruded hook 151 of the hook member 15. Then the smart phone 7 can be mounted on the clamping assembly 6 such that the passenger can watch TV programs or can surf the smart phone 7.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A HANS (head-and-neck support) device, comprising:
   a fixing frame adapted to be installed on a head support pillar of a vehicle seat;
   a rotary arm connected pivotally to one end of said fixing frame and having a curved extension portion such that said rotary arm is rotatable limitedly to a predetermine angle with respect to said fixing frame, where said rotary arm extends perpendicularly from said fixing frame: and
   a soft pillow including a flexible cushion sheath sleeved over said curved extension portion of said rotary arm and an externally enclosing sheath sleeved around said cushion sheath;
   wherein, when said rotary arm is rotated relative to and abuts against said fixing frame, said soft pillow is used for supporting the neck of a user and when said rotary arm is rotated to said predetermined angle relative to said fixing frame, said soft pillow is used for supporting a lateral side of the user's head.

2. The HANS device according to claim 1, wherein, said fixing frame includes a rack defining the end for pivotally connection with said rotary arm and two clamp units mounted on said rack in such a manner that said clamp units are movable along a longitudinal length of said rack.

3. The HANS device according to claim 2, wherein, said rack has an upper and lower side surfaces formed with a plurality of insert holes along its longitudinal length thereof and a generally U-shaped insert that is adapted to be disposed on and span across a respective one of said clamp units for inserting into two of said insert holes, thereby retaining securely said respective one of said clamp units on said rack.

4. The HANS device according to claim 2, wherein, each of said clamp units includes a main clamp piece, a movable clamp piece mounted on said main clamp piece and movable along the longitudinal length of said rack and a rotary knob mounted on said movable clamp piece in such a manner that rotation of said rotary knob results in movement of said movable clamp piece toward and away from said main clamp piece and simultaneously resulting in tightening and/or loosening of said main clamp piece relative to said rack.

5. The HANS device according to claim 4, wherein, said main clamp piece of each of said clamp units is sleeved slidably on said rack such that said clamp units are movable along the longitudinal length of said rack.

6. The HANS device according to claim 2, wherein, said fixing frame 1 further includes a hook member mounted on said rack so as to be disposed between said two clamp units and movable along the longitudinal length of said rack, said hook member including a protruded hook having a shape complementing with an article to be hung on said protruded hook.

* * * * *